(12) United States Patent
Sha

(10) Patent No.: US 7,802,430 B1
(45) Date of Patent: Sep. 28, 2010

(54) CONDENSERS EFFICIENCY THROUGH NOVEL PCS TECHNOLOGY

(76) Inventor: William T. Sha, 2823 Meyers Rd., Oak Brook, IL (US) 60523

( * ) Notice: Subject to any disclaimer, the term of this patent is extended or adjusted under 35 U.S.C. 154(b) by 14 days.

(21) Appl. No.: 12/383,218

(22) Filed: Mar. 20, 2009

(51) Int. Cl.
- B01D 19/00 (2006.01)
- F01B 31/00 (2006.01)
- F01K 19/00 (2006.01)
- F01K 9/00 (2006.01)
- G01M 15/00 (2006.01)
- G01M 19/00 (2006.01)

(52) U.S. Cl. .................. 60/657; 60/661; 73/112.01; 73/118.02

(58) Field of Classification Search .............. 60/657, 60/661; 73/112.01, 112.02, 113.01, 118.02
See application file for complete search history.

(56) References Cited

U.S. PATENT DOCUMENTS

| | | | | |
|---|---|---|---|---|
| 3,557,554 | A | * | 1/1971 | Martinek et al. ............. 60/671 |
| 4,059,960 | A | * | 11/1977 | Osborne ..................... 60/646 |
| 4,390,058 | A | | 6/1983 | Otake et al. |
| 4,517,805 | A | * | 5/1985 | Kals ........................... 60/688 |
| 4,958,679 | A | | 9/1990 | Drosdzick et al. |
| 5,005,351 | A | | 4/1991 | Archer |
| 6,128,901 | A | * | 10/2000 | Sha ............................. 60/557 |
| 6,128,905 | A | | 10/2000 | Fahlsing |

OTHER PUBLICATIONS

Piskorowski, J., et al, Condenser Performance Test and Backpressure Improvement, Electric Power Research Institute Report EPRI-cs-5729, Apr. 1988, Abstract, Report Summary.

Sha, W.T., et al, Condenser Experts Suggest Improvements in Performance, Power Engineering, Jun. 2005, pp. 8,10.

Chien, T.H., et al, COMMIX-PPC, A Three Dimensional Transient Multicomponent Computer Program . . . , Argonne National Laboratory Report ANL-92-2, 1997, Executive Summary.

Sha, W.T., Novel Pressure Control System (PCS) Technology to Improve Steam Power Plant Efficiency . . . , Disclosure Document No. 6009830, USPTO, Nov. 30, 2006.

Sha, W.T., Non-Intrusive Installation of Pressure Control System . . . , (SBIR-1 Award 08ER84947), presented at DOE/NETL meeting on Oct. 22, 2008 at Morgantown, WV., pp. 14-17.

* cited by examiner

Primary Examiner—Thomas E Denion
Assistant Examiner—Christopher Jetton
(74) Attorney, Agent, or Firm—Philip H. Kier

(57) ABSTRACT

This invention improves and integrates a pressure control device (Pressure control device or PCD) into a new and efficient air removal system of a power plant condenser to dramatically improve condenser efficiency by reducing back pressure. The major improvements in the PCD of this invention are summarized below: First, the invention of a condenser steam-air mixture exhaust simulator for production of steam-air mixture at low pressure typical of operating conditions of power plant condensers makes it possible to study condensation mass and heat transfer data and to learn operating procedures for this Novel Pressure Control System (PCS) Technology for optimum reduction of air inventory in a condenser. With these data and procedures, the design and performance of a PCD can be greatly improved. Second, the development of an orifice plate to replace spray nozzles in a PCD greatly enhances the efficiency of the PCD. Third, the creative design for easy, safe and non-intrusive installation of a PCD by introducing a bypass loop avoids shut down of a power plant in case of failure of the PCD. This last feature helps ensure commercial viability of the Novel PCS Technology.

15 Claims, 6 Drawing Sheets

CONDENSERS EFFICIENCY THROUGH NOVEL PCS TECHNOLOGY

BACKGROUND OF THE INVENTION

This invention relates to condenser efficiency in steam power plants for generating electricity. More specifically, it pertains to improving and integrating a pressure control device (PCD), which is the brain of a pressure control system[1] (PCS), into the air removed system (ARS) of a shell and tube power plant condenser to improve the condenser's efficiency.

A condenser is an essential but also largely neglected component in a power plant for generating electricity. In a 1977 report (EPRI EF-422-8R) of the Electric Power Research Institute, Anson estimates: (1) that the loss of large fossil power plant availability directly attributable to condenser problems is 3.8%; and (2) condenser performance can significantly affect heat rate and generation capacity. In a 1988 report[2], Piskorowski, et al, (EPRI-CS-5729) estimate that a 3377 pascal (one inch of mercury) increase in back pressure could result in a 2% reduction in generation capacity.

Air is a non-condensable gas and the presence of excess air in a condenser will significantly degrade the condenser's performance[3]. This is because the heat transfer surface is blanketed by a gas film which becomes highly resistance to heat transfer and lowers power plant efficiency. The amount of air inside a condenser, or air inventory, directly affects power plant condenser performance and is made up of two components, air in-leakage, and un-evacuated air pockets in a condenser tube bundle[3]. Un-evacuated air pockets in a condenser tube bundle is defined as the air in the tube bundle that cannot be removed by the current air removal system. Un-evacuated air pockets behave differently than the air moving around in a condenser in that they tend to be static. During steady state operation, the air in-leakage rate into a power plant condenser can be measured via a rotameter, however, the air inventory inside a condenser cannot be measured, but can be computed via a computer program such as the COM-MIX-PPC[4]. The air in-leakage is due to the condenser operating below atmospheric pressure. Formation of air pockets is due to both poor design of tube bundle and inappropriate location of air off-take pipe. Both poor design of tube bundle and inappropriate location of air off-take pipe are common to most of condensers. A major concern in improving condenser performance, reliability and design is the efficient removal of air to keep air inventory inside a condenser to a minimum. It is to be noted that bio fouling is a maintenance problem and is not a condenser design problem.

To design an efficient and economic air removal system (ARS) for condensers, it is important to understand the major shortcomings of current ARS's. Since the majority of condensers are in-service condensers, special attention is given to them. The shortcomings are listed below.

The current design of air removal systems and condenser performance are de-coupled. The current design of air removal system is based on both the effective steam flow at each main exhaust opening and the total number of exhaust openings without requiring any knowledge of pressure, temperature, velocity and air concentration distributions inside the condenser.

The current air removal system is designed primarily to remove air in-leakage with the flow rate of vacuum pump as its boundary condition and is not designed to remove or reduce the size of air pockets in the condenser tube bundle. Since a condenser tube bundle has a complicated structure, it is difficult to measure or even to calculate both air concentration and pressure distribution in the tube bundles. As a result, the physical phenomenon of the formation and removal of air pockets in a tube bundle, which is critical to the condenser performance, is easily overlooked. The final shortcoming is that current air removal systems are passive systems. Their steady state operating pressure attains equilibrium by itself and cannot be changed.

In U.S. Pat. No. 6,128,901[1], Sha teaches the use of a pressure control system (PCS) to enhance the performance of air removal systems in all existing power plant condensers. A pressure control system contains a pressure control device (PCD), which is a direct contact heat exchanger with sub-cooled liquid droplets to condense steam in a steam-air mixture from condenser exhaust, a variable speed pump, a chiller, flow measuring device, and temperature and pressure measuring devices. These components are connected to form a loop to circulate cold water to the PCD, where through a spray nozzle or orifice plate to form water droplets, a steam-air mixture from the condenser via an air off-take pipe (outside the condenser casing) is condensed in whole or in part. The operating pressure in the PCD is lowered as a function of the amount of steam condensed. The PCS adjusts the condensation rate in the PCD to yield an optimum minimum pressure. The condensation rate can be changed by adjusting either the flow rate or the temperature of the water from the chiller located upstream of the PCD. It is to be noted that the PCD pressure is essentially the same as at the inlet of a two-staged liquid-ring vacuum pump (TSLRVP) or the suction of a steam jet air ejector (SJAE). Thus an optimum pressure gradient between the condenser and the inlet of the vacuum pump or SJAE is created, which facilitates removal of air from the condenser. Also the PCS automatically changes the boundary condition at the inlet of the vacuum pump or the suction of the SJAE with its flow rate to the operating pressure of the PCD to greatly enhance air removal. It should be noted that if the steam flow rate entering a typical condenser is normalized to unity, the condenser exhaust flow rate is in the order of 0.02% of unity. The impact of condenser exhaust flow rate as boundary condition on removal of air is expected to be minimal as comparing to the pressure boundary condition.

The pressure control system lowers pressure at the PCD and therefore automatically reduces pressure at the air off-take pipe, to become the lowest, or close to the lowest pressure in the shell side of the condenser. Thus the efficiency of the existing air removal systems will be improved. If the air off-take pipe were located in a high pressure region in the shell side, air would move from the high pressure region to the lower pressure region and the efficiency of the air removal system would be lowered. With a PCS incorporated into an existing air removal system, it is expected not only to remove air in-leakage more efficiently, but also be capable of removing or reducing the size of air pockets in the condenser tube bundle. All current air removal systems for condensers are passive systems. Air removal systems with pressure control systems are no longer passive systems because the optimum gradient between the condenser and PCD is maintained at all times. With PCS incorporated into the existing air removal systems, all the shortcomings as outlined above are eliminated.

SUMMARY OF THE INVENTION

Design and installation of pressure control device (PCD) without prior testing could cause unforeseen problems and cause shut down of a power plant. There is no experimental data on heat and mass transfer available in public domain at low pressure in the range of 2-4 inch of Hga of steam-air mixture that is enriched in air in the range of 30 to 90% of air by weight in the mixture. Therefore it is essential to develop a prototype test facility for PCD which ensures its proper design and performance. The first order of business is to simulate low pressure steam-air mixture conditions typical to an operating power plant condenser in the prototype test facility. Because when steam is at low pressure its thermal and physical properties are highly non-linear and it is impossible to interpolate and extrapolate without introducing significant errors.

A new and efficient air removal system named Novel PCS Technology has been invented. It consists of an existing air removal system and an addition of a pressure control system (PCS) (see U.S. Pat. No. 6,128,901) and with major improvements of pressure control device (PCD). The PCD is the brain of the Novel PCS Technology and is a direct contact heat exchanger using sub-cooled water droplets to condense steam of a steam-air mixture exhaust from a power plant condenser. The major improvements of PCD are described below.

One aspect of the instant invention is the development of a condenser steam-air mixture exhaust simulator[5] that duplicates steam-air mixture exhaust from a power plant condenser to the PCD or to the inlet of vacuum pump or the suction of steam jet air ejector. One embodiment of the simulator comprises steam from a steam generator, air injection with air heater, a mixer and a vacuum pump as shown in FIG. 1 without an expansion tank. An alternative embodiment of the condenser steam-air mixture exhaust simulator comprises steam from a steam generator, air injection with air heater, an expansion tank and a vacuum pump as shown in FIG. 1 also. The expansion tank is for mixing and expansion of high pressure of steam and air entering the tank to lower pressure. Another alternative embodiment of the condenser steam-air mixture exhaust simulator having a vacuum pump, a heater, and appropriate water addition and air injection is shown in FIG. 1A. Any of these three embodiments can readily be incorporated into a prototype test facility for Novel PCS Technology. With the condenser steam-air mixture exhaust simulator[5], it is possible to study condensation mass and heat transfer data and to learn operating procedures for this Novel PCS Technology for an optimum reduction of air inventory in a condenser. With these data and procedures, the design and performance of PCD can be greatly improved. In addition, the overall heat transfer coefficients of the PCD can be obtained using this test facility, which allows proper design of a full scale demonstration of the novel PCS technology in a power plant.

Another aspect of the instant invention addresses an improved interface of the PCS with the air off-take pipe of a power plant condenser. In U.S. Pat. No. 6,128,901, the PCS is simply connected to the air off-take pipe of a power plant condenser. However, such a configuration is undesirable should the PCS not be working or needs repair, as power plant operations would be shut down. This invention addresses these situations by introducing a bypass loop[5] to the existing air off-take pipe and locates the PCD either in the air off-take pipe or the bypass loop. Two three-way ball valves could be cut into an existing air off-take pipe to accommodate the bypass loop. The bypass loop introduces the following advantages: 1) when the pressure control system is not working, operations can revert to the original design (without the PCS) without a power plant shut down; 2) the pressure control system can be repaired on-site without interfering with power plant operation; and 3) it provides great flexibility to install PCS system especially for in-service condensers with space limitations; The novel PCS technology can be implemented in an easy, safe and non-intrusive manner as part of an existing power plant configuration. This makes the technology highly attractive and helps ensure its commercial viability.

The third novel aspect of this invention is the spraying means used in the pressure control device (PCD) for condensing steam in a steam-air mixture. A conventional spray nozzle provides droplets flowing downward in a conical pattern such that some of the droplets will hit the wall of the PCD rather than being concentrated in the interior. An innovative orifice plate[6] allows liquid droplets with controlled size to flow downward uniformly to increase contact surface area between liquid droplets and the steam-air mixture. This orifice plate greatly improve the efficiency of condensing steam of the steam-air mixture in the PCD. It is to be noted that there are many ways to condense steam in steam-air mixture. For example, the steam of steam-air mixture could be condensed after bubbling through chilled water in a vertical long container or appropriate pressure can be used to condense the steam of the steam-air mixture. Still another alternate to a mixing vessel or PCD in a pressure control system, suggested by Mr. Phil Yakimow is an in-inline steam condensing section. The condensing section would be comprised of a spray section in which the condenser steam-air mixture exhaust is exposed to a cooling mist of pressurized condensate. The spray would mix intimately with the condenser steam-air mixture exhaust and result in the steam condensing and thus reducing the pressure of the spray section. This also effectively reduces the volume of steam going to the TSLRVP or SJAE. The piping to supply the cooling mist spray could be either internal or external to the air removal pipe coming from the condenser.

The relatively poor performance of current power plant condensers is mainly attributable to their air removal systems being inefficient and unable to remove or reduce the size of air pockets in condenser tube bundles. The technology taught in this invention: 1) enhances fundamental understanding of condensation mass and heat transfer in a PCD leading to a better design and improving efficiency of a PCS; 2) introduces a by-pass loop avoiding shut down power plant due to failure of Novel PCS Technology, facilitating its introduction and making it commercially viable; and 3) improving efficiency by using an orifice plate for more efficient condensation of steam in the steam-air mixture in the PCD. In summary the Novel PCS Technology represents the most efficient air removal system for steam power plant condensers at this time and it facilitates further improvement in design and performance of the orifice plate and advancement in fundamental understanding of condensation mass and heat transfer at very low pressure regimes and highly air enriched of steam-air mixtures.

BRIEF DESCRIPTION OF THE SEVERAL VIEWS

DETAILED DESCRIPTION OF THE INVENTION

A prototype test facility for the novel PCS technology essentially consists of a pressure control device and a steam-air mixture simulator for production of condenser steam-air mixture exhaust of power plants. This simulated condenser steam-air mixture exhaust is fed to the pressure control device (PCD) where sub-cooled water droplets via either spray nozzle or orifice plate condenses steam in steam-air mixture. The operating pressure of PCD is reduced by condensing steam in the steam-air mixture and forming an optimum pressure gradient between condenser (steam-air mixture simulator or a condenser) and PCD (inlet of vacuum pump or suction of steam jet air ejector) to facilitate air removal.

Figure 1:
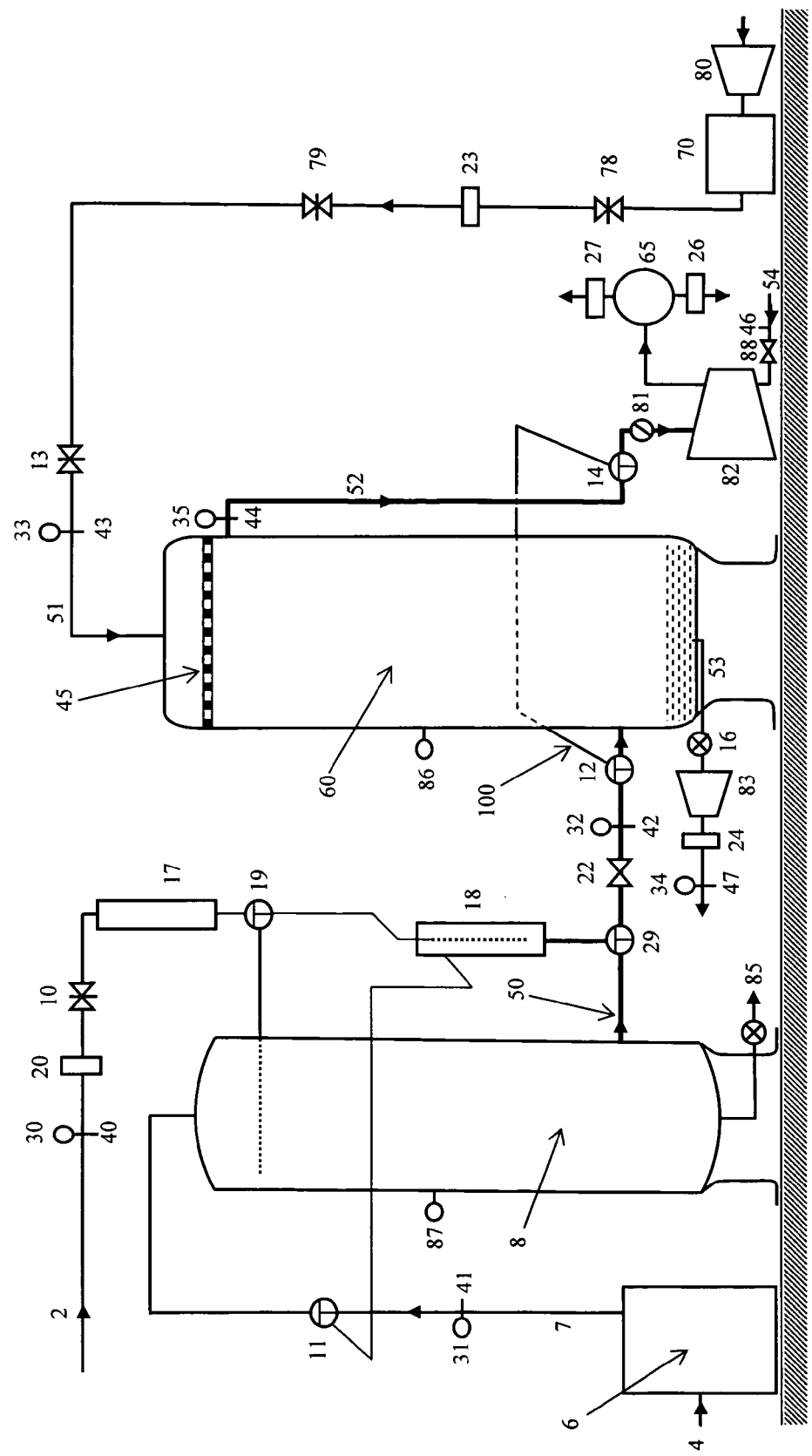
FIG. 1 shows a schematic view of a prototype test facility for Novel PCS Technology with a condenser steam-air mixture exhaust simulator with an external steam generator and with or without an expansion tank.

In a preferred embodiment, the condenser exhaust steam-air mixture simulator has these characteristics. FIG. 1, shows an embodiment that bypasses the expansion tank first and an embodiment with an expansion tank in the next paragraph. Feed water 4 is fed into a steam generator 6 to produce an appropriate amount of steam by knowing heat input to the steam generator and water evaporated at a desired vacuum pressure that leaves the steam generator through pipe 7 to mixer 18. Before entering mixer 18 the steam encounters pressure sensor 31, temperature sensor 41 and valve 11, which could be a three-way ball valve and is set so that expansion tank 8 is bypassed. Similarly, air 2 introduced into the facility at the same pressure as steam encounters pressure sensor 30, temperature sensor 40, flowmeter 20 to give an appropriate amount of air, needle valve 10, air heater 17, and valve 19. This valve which could be a three-way ball valve, directs the heated air to mixer 18 instead of expansion tank 8 in this embodiment. In this mixer, the steam and air are mixed and pressure is preset to the pressure at condenser steam-air mixture exhaust from the power plant by vacuum pump 82. The steam-air mixture leaving mixer 18 passes through valve 29, which could be a three-way ball valve, and is directed to the PCD 60 with desired mass fractions of steam and air and vacuum pressure of the condenser steam-air mixture exhaust. The components described above comprise an embodiment of the condenser steam-air mixture exhaust simulator in the prototype test facility for novel PCS technology.

An alternative embodiment of the condenser steam-air mixture exhaust simulator is also shown in FIG. 1. Here, feed water 4 is fed into a steam generator 6 to produce an appropriate amount of steam by knowing heat input to steam generator and water evaporated that leaves the steam generator through pipe 7. Before entering an expansion tank 8, the steam encounters pressure sensor 31, temperature sensor 41 and valve 11, which is now set to direct the steam to the expansion tank. As before, air 2 introduced into the facility encounters pressure sensor 30, temperature sensor 40, flowmeter 20 to give an appropriate amount of air, valve 10, and air heater 17. Now, 3-way ball valve 19 is set to direct the heated air to enter the expansion tank. Both steam and air enter the expansion tank 8 at the same pressure which is preset to a pressure simulating condenser steam-air mixture exhaust from a power plant by vacuum pump 82. The steam-air mixture leaving the expansion tank to 3-way ball valve 29 is directed to the PCD with a desired vacuum pressure. Pressure in the expansion tank is measured by pressure sensor 87. The components described above comprise an embodiment of the condenser steam-air mixture exhaust simulator in the prototype test facility for novel PCS technology.

Figure 1A:
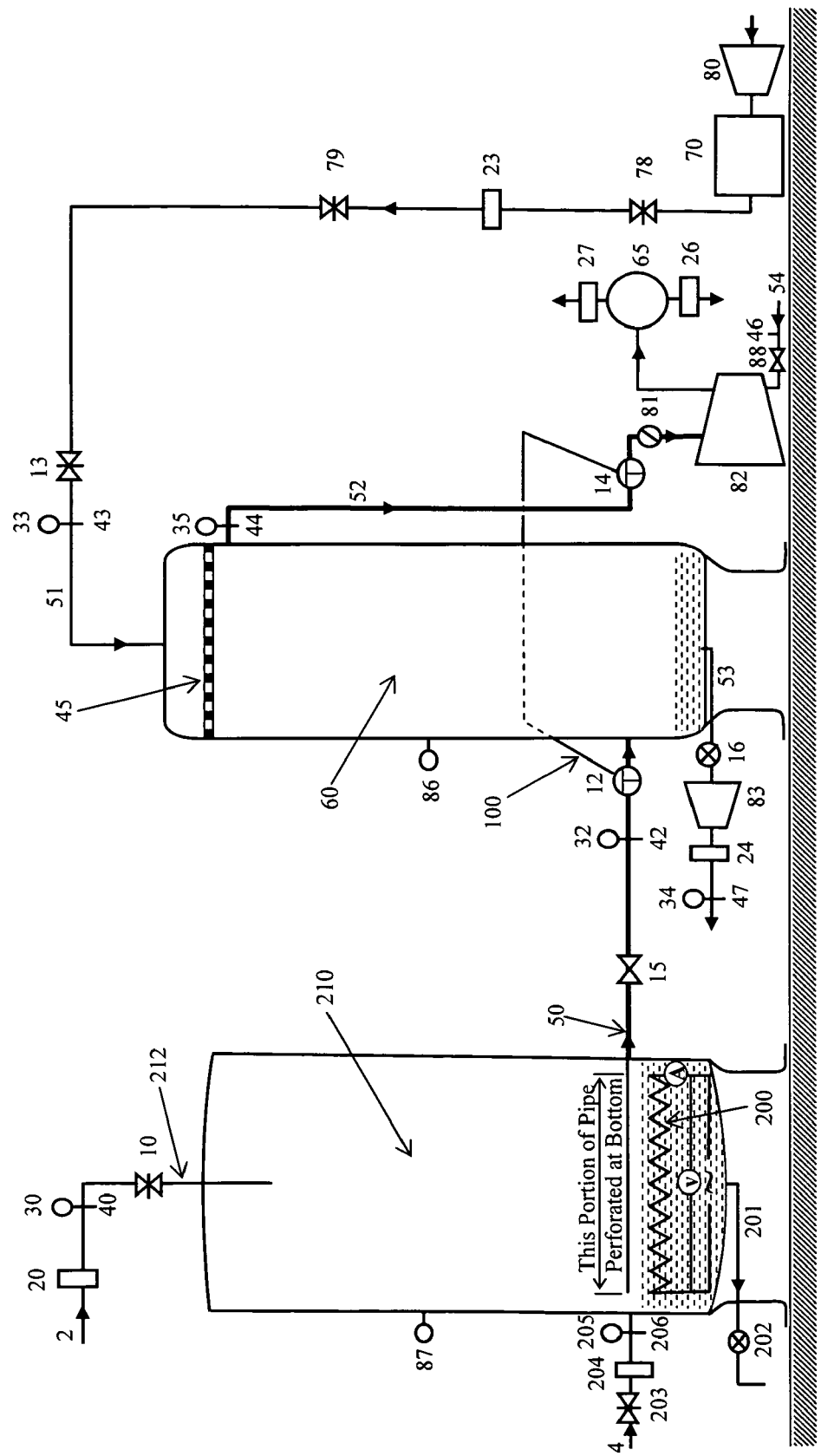
FIG. 1A shows a schematic view of a prototype test facility for Novel PCS Technology with a condenser steam-air mixture exhaust simulator with an internal water heater.

Another alternative embodiment of the condenser steam-air mixture exhaust simulator is shown in FIG. 1A. In this embodiment, as before, air 2 enters the facility and encounters flowmeter 20, pressure sensor 30, temperature sensor 40, needle valve 10 and enters tank 210 through pipe 212. Feed water 4 after encountering needle valve 203, flowmeter 204, pressure sensor 205, temperature sensor 206 and enters the tank and is vaporized when being heated by heater 200. The steam so produced mixes with air in tank 210 and the resulting steam-air mixture, which simulates condenser exhaust leaves the tank via an air offtake pipe 50. Water drains from tank 210 through drain pipe 201 and ball valve 202. Water level is maintained in the tank to keep the heater under water all the time during operation. With proper account of water and air inventory and heat input and the assistance of vacuum pump 82, the condenser steam-air mixture exhaust from power plants can be readily simulated.

The remaining components of the prototype test facility comprise the pressure control system (PCS) including the pressure control device (PCD). Steam-air mixture in pipe 50 encounters gate valve 22, pressure sensor 32. temperature sensor 42 and 3-way ball valve 12 before entering the pressure control device 60, which has pressure sensor 86. Also, entering the pressure control device is chilled water through pipe 51. Water entering the pressure control system is pumped with pump 80 and chilled in chiller 70. This water may be subject to automatic control of either the water temperature via chiller or water flow rate via a variable speed or a regular pump or both. The chilled water in pipe 51 enters the pressure control device 60 at its top after passing through pressure sensor 33, temperature sensor 43, flowmeter 23, and a number of needle valves such as 13, 79, 78 to reduce water pressure to avoid flushing. The pressure control device is a direct contact condenser. The steam-air mixture in the PCD is highly enriched in air, approximately 30% to 90% of air by weight in the mixture. For the pressure control device to efficiently condense the steam of the steam-air mixture, the chilled water must be broken up into droplets via either spray nozzle/ nozzles 49 (see FIG. 2) or orifice plate 45 (see FIG. 2A) and contact between these droplets and the steam-air mixture should be maximized.

Figure 2:
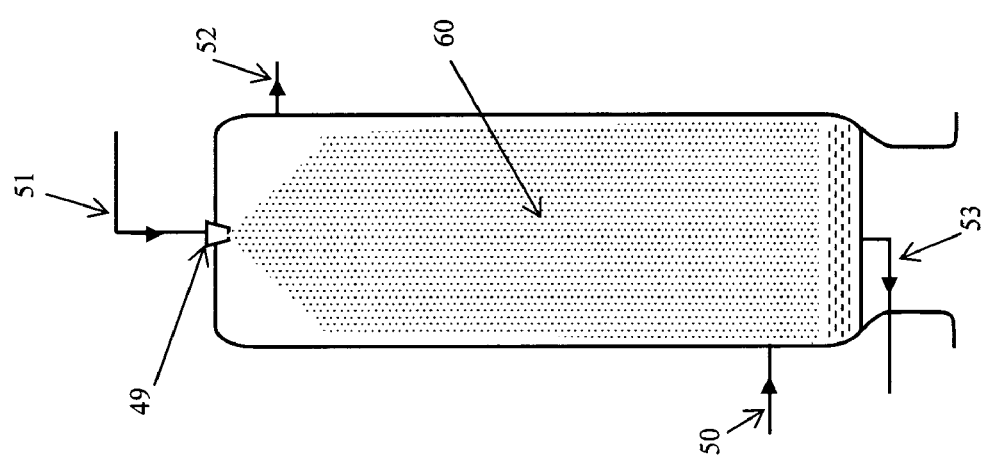
FIG. 2 shows a pressure control device (PCD) with a spray nozzle.
Figure 2A:
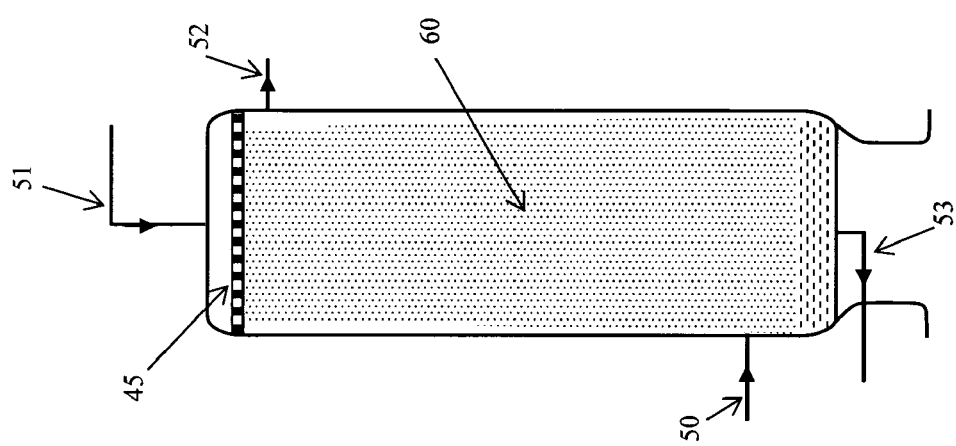
FIG. 2A shows a pressure control device (PCD) with an orifice plate.

The effectiveness of the pressure control device depends on its ability to condense efficiently steam in the steam-air mixture from condenser steam-air mixture exhaust simulator (condenser). A conventional spray nozzle 49 could be used to break up the chilled water into droplets as shown in FIG. 2. A spray nozzle ejects droplets in a conical array so that some contact the walls of the pressure control device and are somewhat ineffective for condensing the steam of steam-air mixture that enters the pressure control device. The spray nozzle 49 could be replaced by an orifice plate 45 with multiple fluid nozzle inserts that form cooled water into droplets with a downward trajectory. As shown in FIG. 2A, these droplets will flow downward uniformly instead of spreading outward in a conical array as the droplets produced in a spray nozzle do. This uniform downward trajectory increases contact surface area between the droplets and the steam-air mixture to increase condensation rates. In FIG. 2 and FIG. 2A, chilled water enters pressure control device 60 through pipe 51 passes through either spray nozzle 49 or orifice plate 45 to form sub-cooled droplets which condense the steam of steam-air mixture entering the pressure control device through pipe 50 and exits through pipe 52 along with uncondensed-steam-air-mixture.

Condensed water or condensate leaves the pressure control device through pipe 53 and then passes through ball valve 16, pump 83, flowmeter 24, pressure sensor 34, and temperature sensor 47. The remaining steam-air mixture leaves the pressure control device through pipe 52 to encounter pressure sensor 35, temperature sensor 44, 3-way ball valve 14, vacuum breaker 81 or vacuum pump 82. Seal water 54 feeds into vacuum pump 82 and encounters temperature sensor 46 and valve 88. The steam-air mixture exhaust from vacuum pump 82 enters steam and air separator condenser 65 where steam is condensed into water and its flow is measured by flowmeter 26 and where the flow of air, in a separate path, is measured by flowmeter 27. Valves 12 and 14 give the capability for steam-air mixture in pipe 50 to bypass the pressure control device through by-pass loop 100.

Figure 3:
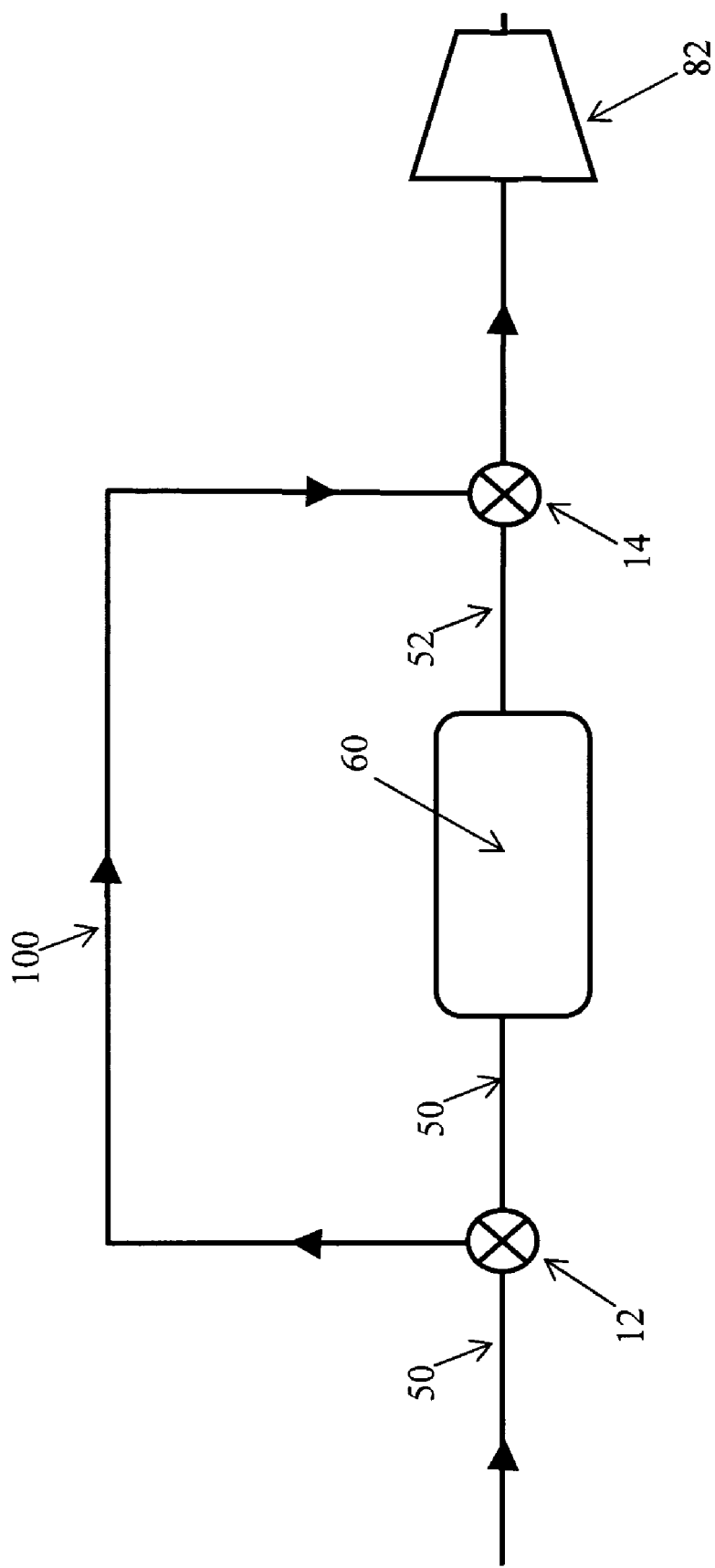
FIG. 3 shows an installation of pressure control device (PCD) in the air off-take pipe.
Figure 3A:
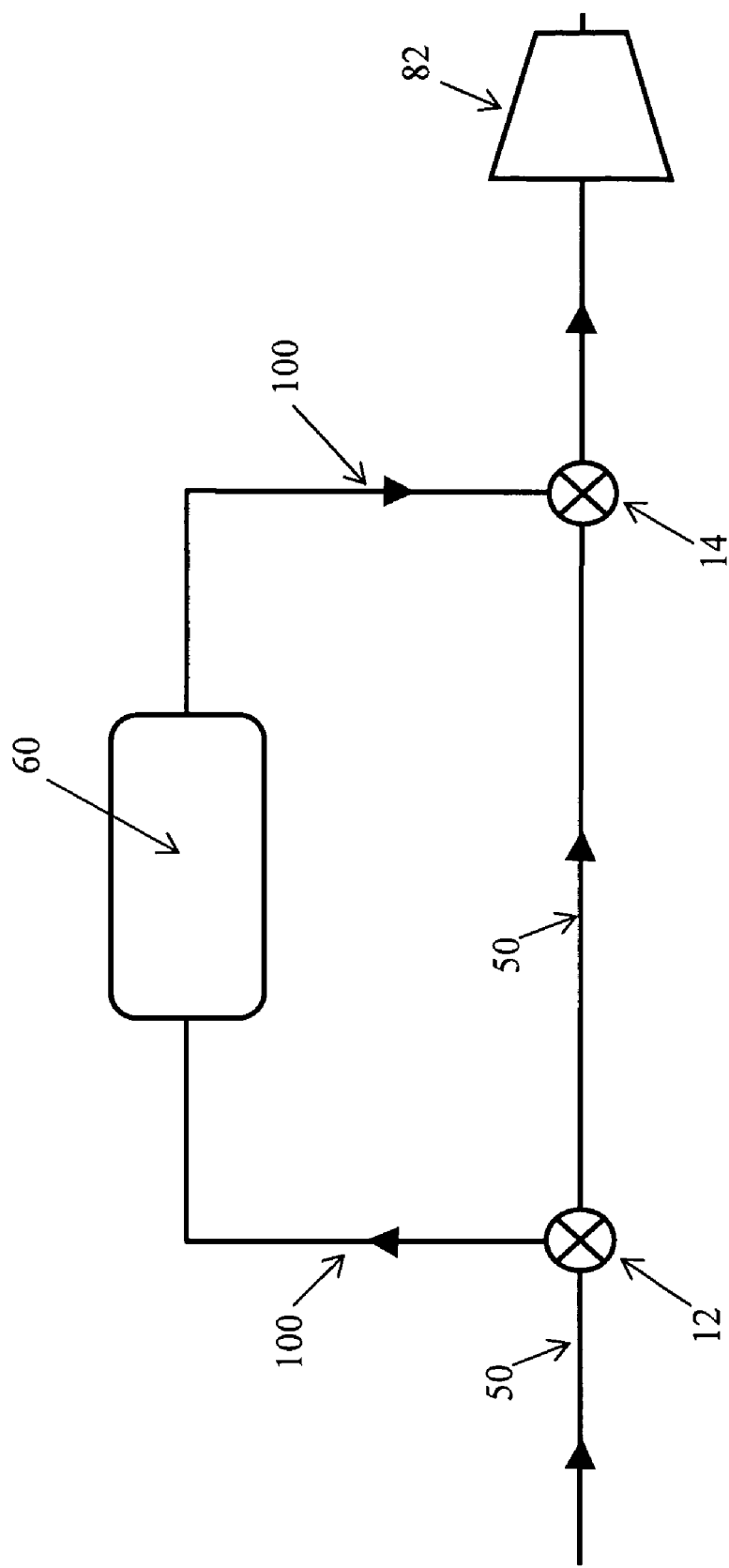
FIG. 3A shows an installation of pressure control device (PCD) in a bypass loop.

The PCD can either be installed in the air off-taking pipe of a condenser as shown in FIG. 3 as described above, or the PCD can be installed in the bypass loop 100 as shown in FIG. 3A. With reference to FIG. 3 and FIG. 1 or FIG. 1A, the steam-air mixture passes through the existing air off-take pipe 50 external to the condenser casing goes direct to PCD 60 and exits at the top of PCD along pipe 52 through pressure and temperature sensors 35 and 44, valve 14, vacuum breaker 81 to the inlet of a two-stage liquid ring vacuum pump (TSLRVP) or steam jet air ejector (SJAE) 82. Should valves 12 and 14 be set to bypass the pressure control device, steam-air mixture would pass though valve 12 and along bypass loop 100 and through valve 14 to the TSLRVP or SJAE.

The function of the TSLRVP could alternative be performed by a steam jet air ejector (SJAE), as indicated above. The pressure control system including pressure control device 60 allows adjustment of the condensation rate to lower the operating pressure at the PCD which is almost the same pressure at the inlet of the TSLRVP (or at the suction of steam jet air ejector) of the air removal system so that an optimum minimum pressure is attained to reduce air inventory inside the condenser. In case of failure of the PCS, the operator of power plant can use 3-way ball valves 12 and 14 to bypass the failed PCS components and return to the original system (without PCS) without shut down of the power plant.

I claim:

1. Novel pressure control system technology comprising:
a condenser steam-air mixture exhaust simulator having a mixer with a steam inlet pipe and an air inlet pipe, heating means to vaporize water that enters the steam inlet pipe, flow regulating means and pressure and temperature sensing means in both steam and air inlet pipes, flow regulating means, pressure and temperature sensing means and a vacuum pump to adjust pressure in a steam-air mixture outlet pipe of the mixer matching the condenser steam-air mixture exhaust;
a pressure control device for condensing steam in the steam-air mixture inside the device, the pressure control device having an inlet of steam-air mixture from the condenser steam-air exhaust simulator, an inlet for chilled water with spraying means and an outlet for uncondensed air-steam mixture leaving the pressure control device;
a variable speed pump circulating water through a chiller for cooling water used in the pressure control device to condense steam of the steam-air mixture from a condenser exhaust; and
a drain line to remove condensate from the pressure control device.

2. Novel pressure control system technology as set forth in claim 1 wherein the pressure control device is a direct contact condenser and the spraying means is at least one spray nozzle that form chilled water into droplets.

3. Novel pressure control system technology as set forth in claim 1 wherein the pressure control device is a direct contact condenser and the spraying means is an orifice plate that form chilled water into droplets.

4. Novel pressure control system technology as set forth in claim 1 further comprising two-3-way ball valves, and a bypass loop, one valve upstream from the pressure control device, the second valve downstream from the pressure control device, setting of these 3-way ball valve either direct the simulated condenser steam-air mixture exhaust to the pressure control device or to a two-stage liquid-ring vacuum pump through the bypass loop.

5. Novel pressure control system technology as set forth in claim 1 further comprising two-3-way ball valves, and a bypass loop, one valve upstream from the pressure control device, the second valve downstream from the pressure control device, setting of these 3-way ball valve either direct the simulated condenser steam-air mixture exhaust to the pressure control device or to a steam jet air ejector through the bypass loop.

6. Novel pressure control system technology comprising:
a condenser steam-air mixture exhaust simulator having an expansion tank with a steam inlet pipe, and an air inlet pipe, heating means to vaporize water that enters the steam inlet pipe, flow regulating means, and temperature and pressure sensing means and a vacuum pump to adjust pressure in a steam-air mixture outlet pipe of the expansion tank matching the condenser steam-air mixture, the expansion tank for mixing and expansion of fluids from high pressure to low pressure;
a pressure control device for condensing steam in the steam-air mixture inside the device; the pressure control device having an inlet of steam-air mixture from the condenser steam-air exhaust simulator, an inlet for chilled water with spraying means and an outlet for uncondensed air-steam mixture leaving the pressure control device;
a variable speed pump circulating water through a chiller for cooling water used in the pressure control device to condense steam of the steam-air mixture from a condenser exhaust; and
a drain line to remove condensate from the pressure control device.

7. Novel pressure control system technology as set forth in claim 6 wherein the pressure control device is a direct contact condenser and the spraying means is at least one spray nozzle that form chilled water into droplets.

8. Novel pressure control system technology as set forth in claim 6 wherein the pressure control device is a direct contact condenser and the spraying means is an orifice plate that form chilled water into droplets.

9. Novel pressure control, system technology as set forth in claim 6 further comprising two-3-way ball valves, and a bypass loop, one valve upstream from the pressure control device, the second valve downstream from the pressure control device, setting of these 3-way ball valve either direct the simulated condenser steam-air mixture exhaust to the pressure control device or to a two-stage liquid-ring vacuum pump through the bypass loop.

10. Novel pressure control system technology as set forth in claim 6 further comprising two-3-way ball valves, and a bypass loop, one valve upstream from the pressure control device, the second valve downstream from the pressure control device, setting of these 3-way ball valve either direct the simulated condenser steam-air mixture exhaust to the pressure control device or to a steam jet air ejector through the bypass loop.

11. Novel pressure control system technology comprising: a condenser steam-air exhaust simulator having a tank with a water inlet pipe and an air inlet pipe, heating means in the tank to vaporized water to steam that mixes with air in the tank to form a steam-air mixture, flow regulating means and pressure and temperature sensing means in the water inlet pipe and the air inlet pipe and a vacuum pump to adjust pressure of the steam-air mixture in the outlet pipe of the tank matching the condenser steam-air mixture exhaust.

12. Novel pressure control system technology as set forth in claim 11 wherein the pressure control device is a direct contact condenser and the spraying means is at least one spray nozzle that form chilled water into droplets.

13. Novel pressure control system technology as set forth in claim 11 wherein the pressure control device is a direct contact condenser and the spraying means is an orifice plate that form chilled water into droplets.

14. Novel pressure control system technology as set forth in claim 11 further comprising two-3-way ball valves, and a bypass loop, one valve upstream from the pressure control device, the second valve downstream from the pressure control device, setting of these 3-way ball valve either direct the simulated condenser steam-air mixture exhaust to the pressure control device or to a two-stage liquid-ring vacuum pump through the bypass loop.

15. Novel pressure control system technology as set forth in claim 11 further comprising two-3-way ball valves, and a bypass loop, one valve upstream from the pressure control device, the second valve downstream from the pressure control device, setting of these 3-way ball valve either direct the simulated condenser steam-air mixture exhaust to the pressure control device or to a steam jet air ejector through the bypass loop.

* * * * *